E. K. SCHWING.
RAT TRAP.
APPLICATION FILED MAR. 14, 1912.
1,030,750.
Patented June 25, 1912.
2 SHEETS—SHEET 1.
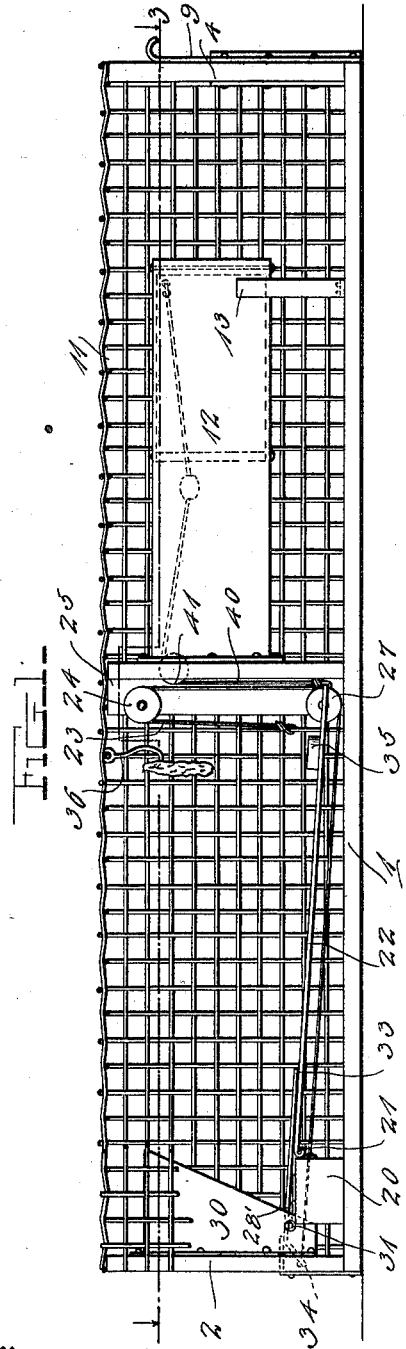
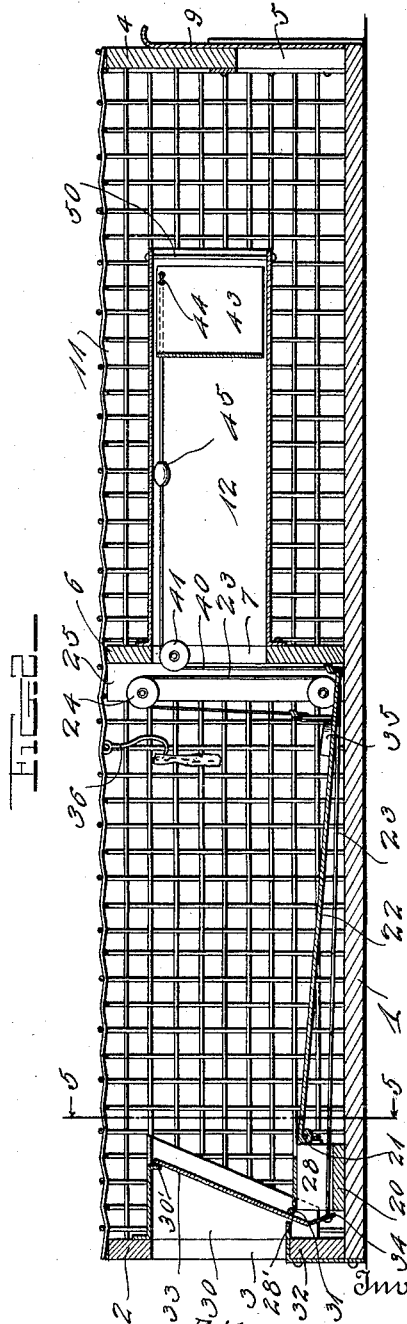
Witnesses:
J. P. Pierce
N. Collamer
Inventor:
E. K. Schwing
by H. B. Willson & Co.,
Attorneys

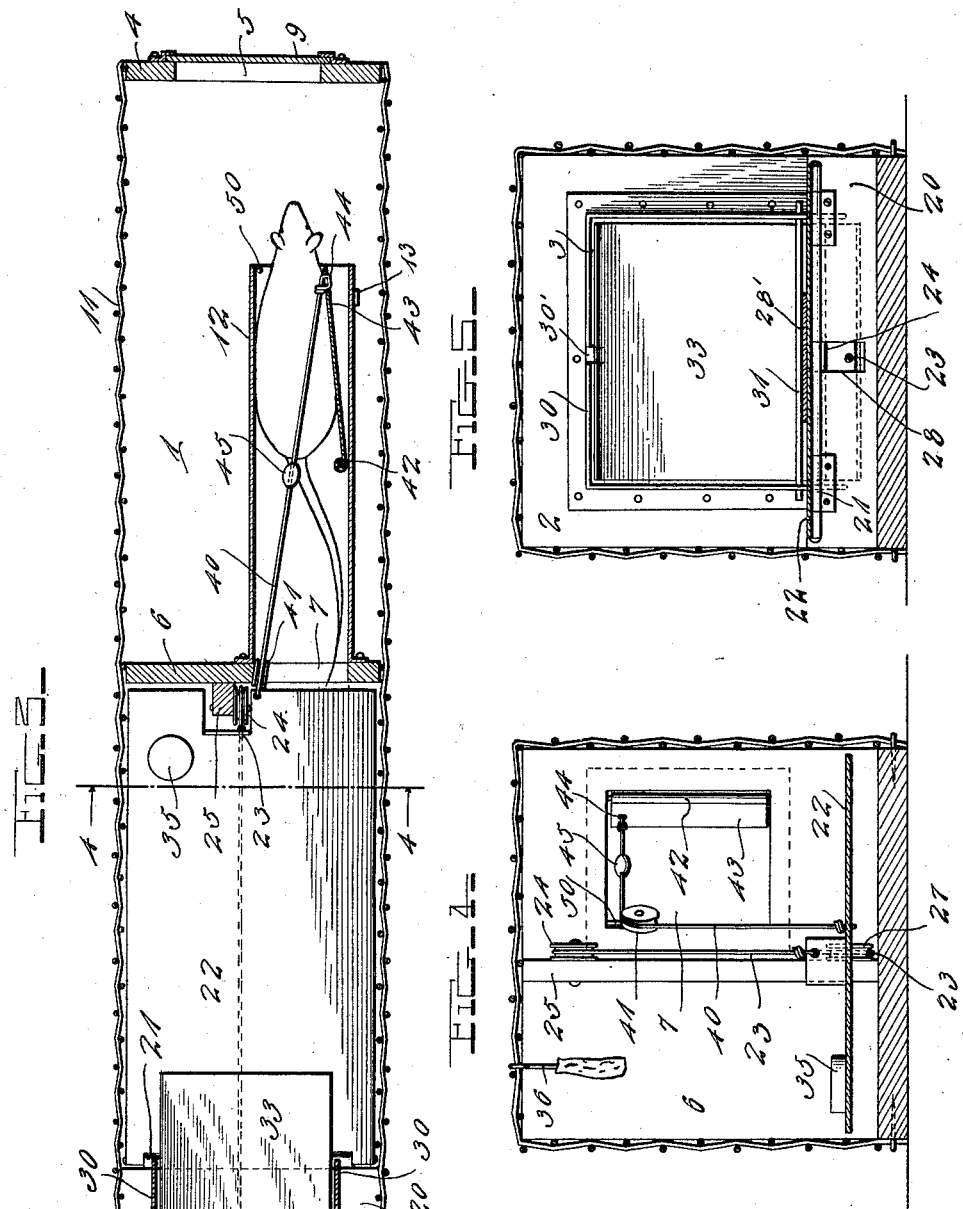

UNITED STATES PATENT OFFICE.

EDWARD K. SCHWING, OF MIDDLETOWN, OHIO.

RAT-TRAP.

1,030,750.  Specification of Letters Patent.  Patented June 25, 1912.

Application filed March 14, 1912. Serial No. 683,798.

*To all whom it may concern:*

Be it known that I, EDWARD K. SCHWING, a citizen of the United States, residing at Middletown, in the county of Butler and State of Ohio, have invented certain new and useful Improvements in Rat-Traps; and I do declare the following to be a full, clear, and exact description of the invention, such as will enable others skilled in the art to which it appertains to make and use the same.

This invention relates to traps, and more especially to those which are reset by the victim; and the objects of the same are to effect improvements in the two doors used in this trap, resulting in the advantages set forth in the following specification and claims.

In the accompanying drawings—Figure 1 is a side elevation of this trap (with most of the wire netting on the nearer side removed), showing the front door open and the parts in position for the entrance of the rat or other animal to be caught. Fig. 2 is a central vertical longitudinal section through the trap showing the parts in the position they assume when the animal has entered the antechamber and has therefore automatically closed the front door behind him. Fig. 3 is a horizontal section on the line 3—3 of Fig. 1, showing the animal pushing through the door within the chute, on his way to the rear compartment or cage. Figs. 4 and 5 are cross sections on the lines 4—4 and 5—5 of Figs. 3 and 2 respectively.

In the drawings the numeral 1 designates the bottom, 2 the front having a front-door-opening 3, 4 the rear having a rear-door-opening 5, and 6 a transverse partition having through it an opening 7 for a purpose to be explained, these various members being of wood or of any other suitable material; and 8 is wire netting or the like which forms the two sides and top of the cage and is secured to the edges of the bottom 1 and the upright members, 2, 4, and 6. No novelty is claimed for the structure of the rear door 9 out of which the entrapped animals are removed. The partition 6 extends across the cage at or near its mid-length and divides it into a front compartment or ante-chamber 10 and a rear compartment or cage 11, and the size of these compartments and of the various elements herein described may be altered to suit the wishes of the manufacturer. The opening 7 through the partition 6 by means of which these compartments are connected is preferably disposed some distance above the bottom 1. Secured to the rear face of said partition and extending thence into the cage is a chute 12, preferably made of metal and of rectangular contour, its rear end being supported by a leg 13, and this chute forms the means of communication between the antechamber and the cage and is elevated above the bottom of the latter so that the trapped animals collect upon the bottom and will have no inclination to pass forward out the chute through which they entered.

Upon the bottom 1 near the front 2 is mounted a cross strip 20 to which is hingedly connected as at 21 a false bottom 22, and from the rear end of the latter a cord, rope, chain, or wire 23 leads upward over a pulley 24 pivoted on a standard 25 carried by the front face of the partition 6, thence downward under another pulley 27, and thence forward under the bottom 22 and through an opening 28 in the strip 20, this wire having a function which will be explained below.

Secured to the inner face of the front 2 around the door opening 3 therein is a metallic shield 30 wider at its top than at its bottom and with its sides preferably tapering downward as seen in Fig. 1, and hinged as at 31 on a line just in rear of the door sill 32 is the front door 33 which is preferably of metal and is necessarily of a size to pass upward into the rear end of the shield 30 against a lip 30' when it is closed. The lower edge of the door projects beyond the hinge line 31 and under a plate 28' overlying the notch 28, and is bent rearward as at 34, and to this edge the wire 23 is connected. Finally a suitable weight 35 is applied to the false bottom 22 near its rear edge if necessary, and a bait is disposed within the ante-chamber 10 as by being hung upon the hook 36.

The construction and proportion of parts is such that when the trap is set as seen in Fig. 1 the door 33 is closed down upon the false bottom 22 and the weight of its body when standing in a horizontal position is such that its short lower edge 34 draws on the wire 23 with sufficient tension to lift the free rear edge of the false bottom 22 and its weight 35. Now when an animal enters and passes over the front door 33 and steps off onto the false bottom 22, his weight added to the latter draws upon the wire 23 which, moving over the pulleys 24 and 27, pulls the lower edge 34 of the door to the rear and causes its body to rise into the rear end of the shield 30 as seen in Fig. 2; and the rat is trapped in the ante-chamber.

From the rear edge of the false bottom 22 rises another cord, rope, wire or chain 40 which passes over a suitable pulley 41 pivoted within the opening 7 through the partition 6, and leads thence to the rear within the chute 12. The latter contains a door 43 pivoted on a vertical line as by hinges 42 connecting its forward edge with one side of the chute 12, and to its rear end the wire 40 is connected at the point 44, a weight 45 being hung on the wire between said point and the pulley 41 and serving to hold the door 43 normally closed obliquely across the chute 12 as seen in Fig. 2. The wire 40 is somewhat slack, and it results that a depression of the false bottom 22 by the weight of the animal entering the ante-chamber simply takes up the slack and raises the weight 45 as will be obvious.

After an animal has been trapped in the ante-chamber as above described, he naturally seeks a chance to escape; and, jumping through the opening 7 in the partition 6, he passes into the chute 12 and pushes by the door 43 as seen in Fig. 3. This swings said door open and draws on the wire 40 which, moving over the pulley 41, lifts the rear end of the false bottom so that all tension is taken off of the wire 23 and the weight of the front door 33—which never rose to a vertical position—causes it to fall back upon the false bottom 22 so that the trap is reset and the parts stand as seen in Fig. 1. The weight 45 causes the closing of the door 43 immediately after the animal has passed it, and he drops out the rear end of the chute 12 into the cage 11 among the other victims who have preceded him.

A feature of my invention consists in placing an upright rod 50 through the rear end of the chute 12 adjacent the free or rear end of the door 43, so that no animal by accident could possibly push his nose behind this end and open the door, even if he should climb to and pass into the rear end of the chute 12 which is highly improbable.

Attention is directed to the proportion of parts at the inlet which causes them to remain automatically in either of the positions shown in Figs. 1 and 2. In Fig. 1 the door 33 by its weight lies flat upon the false bottom 22 whose free edge and weight 35 are held raised by the wire 23 and the leverage resulting from its proximity to the hinge line 31, the now nearly horizontal position of the lower edge 34 and the wire 40 and weight 45. After the animal has entered the ante-chamber and depressed the false bottom, whether he remains thereon or jumps upward into the chute 12, the wire 23 raises the door 33 up to the position seen in Fig. 2 where it stands nearly but not quite vertical, and in this position the weight of the false bottom transmitted to the now nearly upright lower edge 34 is sufficient to hold the door closed. So that some resetting device like the other door 43 and its connections becomes necessary, and my construction of trap is such that the trapped animal automatically actuates the resetting device as he passes from the ante-chamber through the chute into the cage.

What is claimed as new is:

1. In a trap, the combination with the body having a cross partition producing an ante-chamber and a cage and pierced with an opening, the front of the body also having an opening, a front door hinged across the latter, and a false bottom within said ante-chamber operatively connected with the front door so as to close it when said bottom is depressed; of a chute rectangular in cross section and leading to the rear from the opening in said partition, a leg supporting the chute above the bottom of said cage, a door hinged on a vertical line within said chute and extending obliquely across the same to the rear, a wire leading from the free edge of this door to the false bottom, and means for holding said door normally closed.

2. In a trap, the combination with the body having a cross partition producing an ante-chamber and a cage and pierced with an opening, a pulley pivoted therein, the front of the body also having an opening, a front door hinged across the latter, and a false bottom within said ante-chamber operatively connected with the front door so as to close it when said bottom is depressed; of a chute rectangular in cross section and leading to the rear from the opening in said partition, a door hinged on a vertical line within said chute and extending obliquely across the same to the rear, a wire leading from the free edge of this door over said pulley to the false bottom, a weight hung on the wire between the pulley and door, and an upright rod fixed across the chute just in rear of the free edge of said door in its closed position, for the purpose set forth.

3. In a cage, the combination with the body including three cross members having openings, a manually controlled door closing the rearmost opening, an automatically closed door controlling the opening in the intermediate member, and a metallic shield surrounding the opening in the front member and made widest at its top; of a front door hinged across its bottom within said shield with its lower edge depending a short distance beyond the hinge line and bent to the rear, a cross strip within the body in rear of the door, a false bottom hinged at its front edge on said strip with its rear edge movable vertically beneath said opening in the intermediate cross member, connections between said last-named edge and the lower edge of the door for closing the latter when the false bottom is depressed and for permitting such door to fall open when the free edge of the false bottom is raised, and connections between such free edge and the automatically closed door, for the purpose set forth.

4. In a cage, the combination with the body including three cross members having openings, a manually controlled door closing the rearmost opening, an automatically closed door controlling the opening in the intermediate member, and a metallic shield surrounding the opening in the front member and made widest at its top; of a front door hinged across its bottom within said shield with its lower edge depending a short distance beyond the hinge line and bent to the rear, a cross strip within the body in rear of the door, a false bottom hinged at its front edge on said strip with its rear edge movable vertically beneath said opening in the intermediate cross member, a standard secured to the front face of the intermediate cross member, pulleys thereon, a wire leading from the free edge of the false bottom over one of said pulleys, down under the other, and thence forward and connected with the lower edge of the front door, and other connections between the free edge of the false bottom and said automatically closed door, for the purpose set forth.

In testimony whereof I have hereunto set my hand in presence of two subscribing witnesses.

EDWARD K. SCHWING.

Witnesses:
W. H. TODHUNTER,
MILDRED TODHUNTER.

---

Copies of this patent may be obtained for five cents each, by addressing the "Commissioner of Patents, Washington, D. C."